INVENTOR.
JAMES C. HATHAWAY
BY
Moody and Phillips
ATTORNEYS

Nov. 1, 1966 J. C. HATHAWAY 3,283,313

THIN FILM MAGNETIC REGISTER

Filed May 3, 1963 7 Sheets-Sheet 2

INVENTOR.
JAMES C. HATHAWAY
BY Moody and Phillips
ATTORNEYS

INVENTOR.
JAMES C. HATHAWAY
BY Moody and Phillips
ATTORNEYS

Nov. 1, 1966 J. C. HATHAWAY 3,283,313

THIN FILM MAGNETIC REGISTER

Filed May 3, 1963 7 Sheets-Sheet 4

INVENTOR.
JAMES C. HATHAWAY
BY Moody and Phillips
ATTORNEYS

INVENTOR.
JAMES C. HATHAWAY
BY Moody and Phillips
ATTORNEYS

INVENTOR.
JAMES C. HATHAWAY
BY Mooney and Phillips
ATTORNEYS

INVENTOR.
JAMES C. HATHAWAY
BY Moody and Phillips
ATTORNEYS

United States Patent Office 3,283,313

Patented Nov. 1, 1966

3,283,313

THIN FILM MAGNETIC REGISTER

James C. Hathaway, Corona del Mar, Calif., assignor to Collins Radio Company, Cedar Rapids, Iowa, a corporation of Iowa Filed May 3, 1963, Ser. No. 277,747
13 Claims. (Cl. 340—174)

Figures 1, 1A:
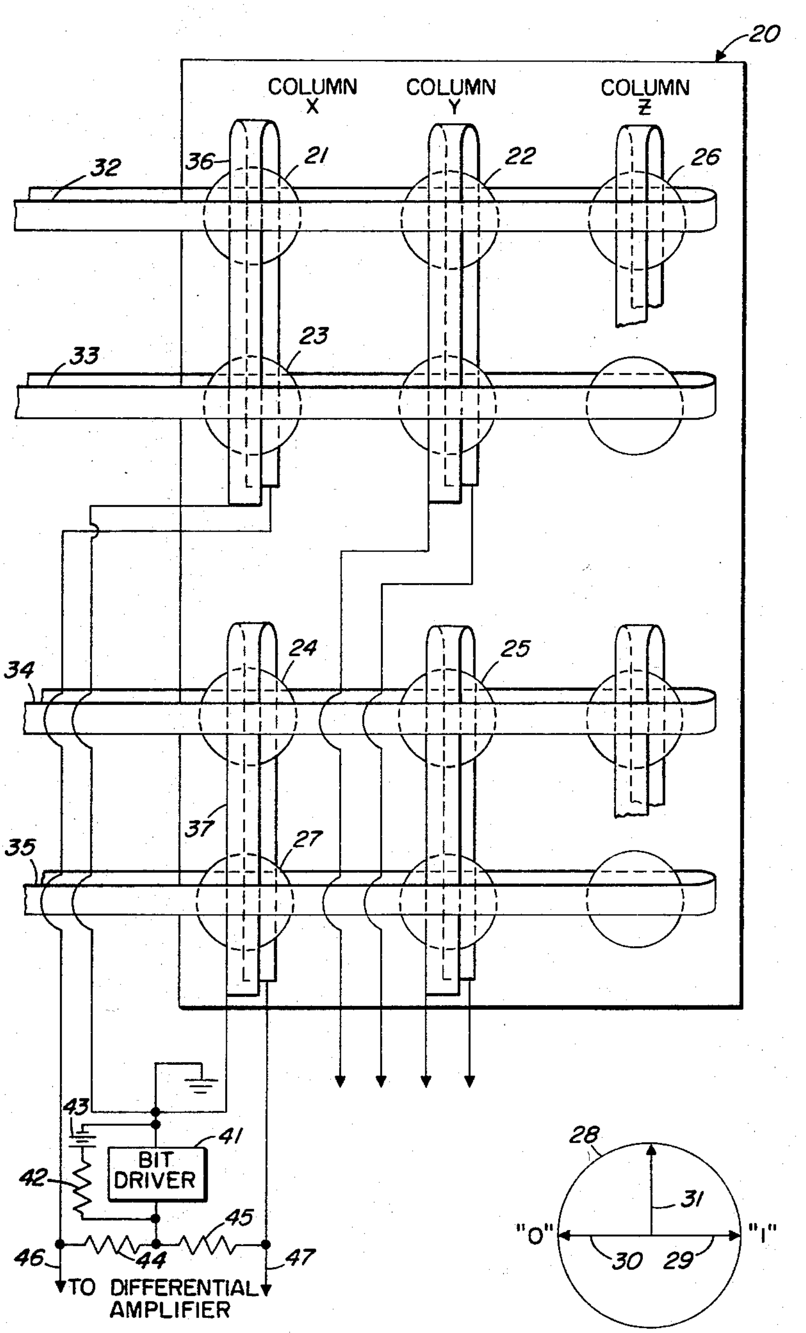

This invention relates, generally, to thin film magnetic registers and, more particularly, to circuit means for reading a word from a given address of a thin film magnetic register and writing said word back into said given address and also into another address, all in one cycle of operation.

A recent development in magnetic memories is is a thin film magnetic register wherein a number of spots of a magnetic material are electroplated or otherwise deposited upon a sheet of insulative material. One type magnetic material commonly used is permalloy which can be deposited on the insulative sheet either by vacuum deposition, or by electroplating in a magnetic field, for example. The specific methods of forming the magnetic spots on an insulative sheet are known in the art and do not form a portion of this invention. For a detailed description of such processes, reference is made to an article entitled "Magnetic Film Memory Design" which appears on page 155 of the January 1961 Proceedings of the IRE, a special issue on computers.

The thin film magnetic registers provide advantages over other known types of memory devices in that the switching time is very fast, being about one nanosecond for fields of approximately two Oersteds. In modern computer applications such high-speed operation is a distinctly desirable characteristic. Consequently, such registers are finding use in modern high-speed computer applications. One particular operational feature sought for is the capability of reading and writing information from and into the register in as few operational steps as possible. As a specific example, in certain applications, it is necessary to read a word from a particular address in the magnetic register and then, since the read-out is destructive in nature, to write the word back into said given address and also into some other selected address in the register. In prior art circuits for performing this function with a thin film magnetic memory register, such operation has required a plurality of individual steps. Each step requires a finite amount of time to accomplish and to that degree limits the speed of operation of the computer. It would mark a definite improvement in the art to be able to perform the above described operation in a single step.

A primary object of the present invention is to read a word from a given address in a thin film magnetic register and to write the word back into said given address and into another address in said register in a single step.

A second aim of the invention is to provide a very high speed magnetic memory device.

A third object of the invention is a magnetic memory device whereby reading and writing of words between said register and peripheral devices or between various addresses in said register is accomplished at very high speeds.

Another purpose of the invention is the improvement of thin film magnetic register circuits, generally.

In accordance with the invention, there is provided a thin film magnetic register comprised of a sheet of insulative material upon which there are deposited a plurality of magnetic spots arranged in a matrix of horizontal rows and vertical columns, each row of spots constructed to hold a binary word, consisting of a plurality of bits, with each spot containing one bit. The polarity of magnetic remanence of each spot determines the nature of the information contained therein. For example, when polarized in one direction the spot contains a binary bit "1," and when polarized in the opposite direction the spot contains a binary bit "0." A first plurality of conductors, known herein as bit lines, is caused to pass individually over each vertical column of spots, but insulated therefrom, and when energized by a current flow therethrough, function to magnetize the spots either in said one polarity or said opposite polarity. A second plurality of conductors, known as row-selecting or address-selecting lines, are individually passed across the surfaces of each horizontal row of spots, but insulated therefrom and from the first plurality of conductors. The second plurality of conductors function, when a current is passed therethrough, to rotate the magnetic vector in each of the spots in the associated row 90° from either the binary bit "1" position or the binary bit "0" position.

Each bit line conductor will respond to rotation of a magnetic vector in a spot (caused by energization of one of said second plurality of conductors) to have produced therein a pulse of a polarity representative of the information stored in the circular spots. Means, identified herein as "from" address means, is provided to energize one of the row-selecting lines by supplying a pulse therethrough. Other means identified herein as the "to" address means functions to select another row of said magnetic spots by supplying a pulse through another row select line. Timing means are provided so that the row-selecting pulse generated by the "from" address circuit occurs prior to the row-selecting pulse generated by the "to" address circuit, although both pulses have a period of common time duration during which write-in is caused to occur, as will be described later. However, before write-in occurs, read-out must take place. Such read-out occurs at the initiation of the "from" address pulse which, as indicated above, rotates the magnetic vectors in response in the selected row to induce a voltage in the sensing conductors. Sensing amplifiers, one for each column of magnetic spots or bits, function to respond only to the presence of a "1" in the associated spot of the selected row, to preset a bit driver circuit. Before the "to" address word row is selected, the sensing amplifiers are disabled so that only the word row selected by the "from" address is sensed by the sensing amplifiers. A third pulse generated by the timing means occurs before the expiration of the "to" and "from" pulses and continues after the termination of said "to" and "from" address pulses, thus functioning to read into each of the appropriate spots of the two selected rows of spots, the binary bit "1." Other means are provided to write into each of the remaining spots of the two selected addresses or rows of spots, the binary bit "0." Thus, there is written back into the two selected addresses of the magnetic register the same binary word that was read from the word address selected by the "from" address circuit. It is to be understood that the timing of the various portions of the operation described above are all derived from a single timing pulse, which operation comprises a single complete cycle of operation.

In accordance with a feature of an operation, there is provided an input-output register (different from the thin film magnetic register) which is constructed to store a word received from a peripheral device or from thin film register. Such input-output register is also constructed to write information stored therein back into a selected address of said thin film register, or into some selected peripheral device. The timing means mentioned hereinbefore functions to provide the proper timing of the read-out and write-in of words into and from said input-output register.

Figure 2:
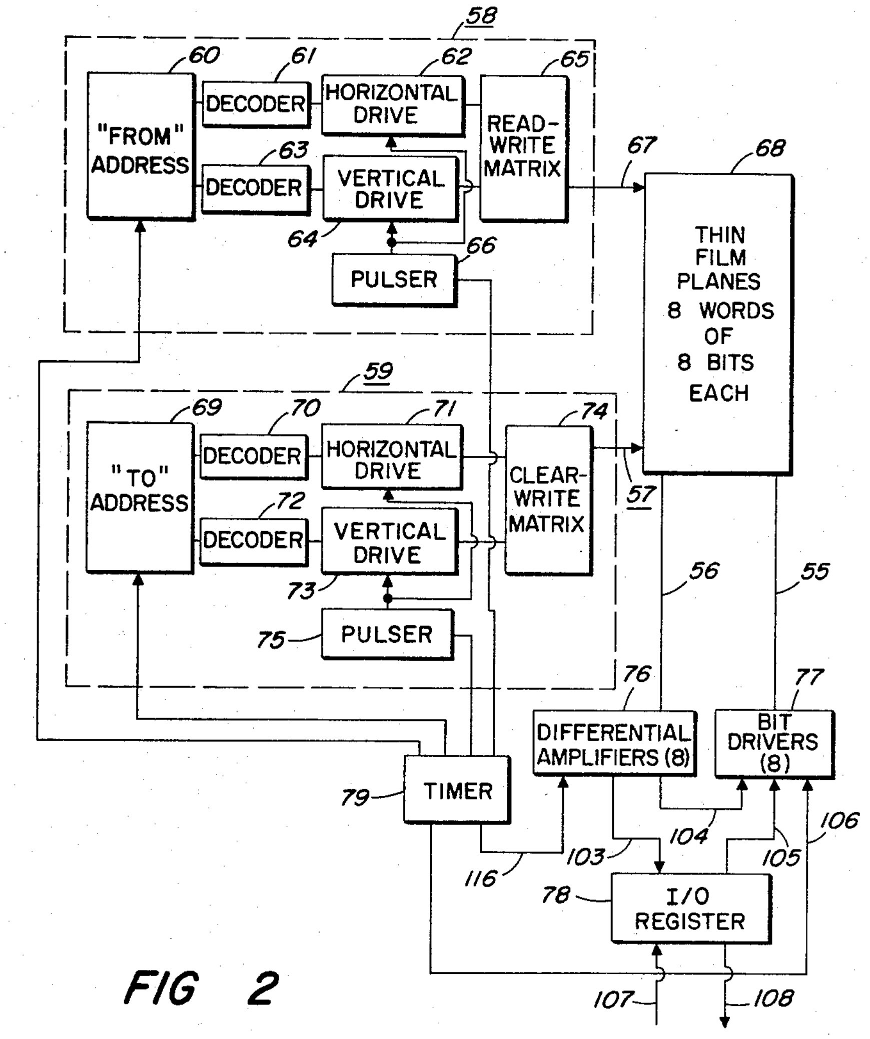
Figure 3:
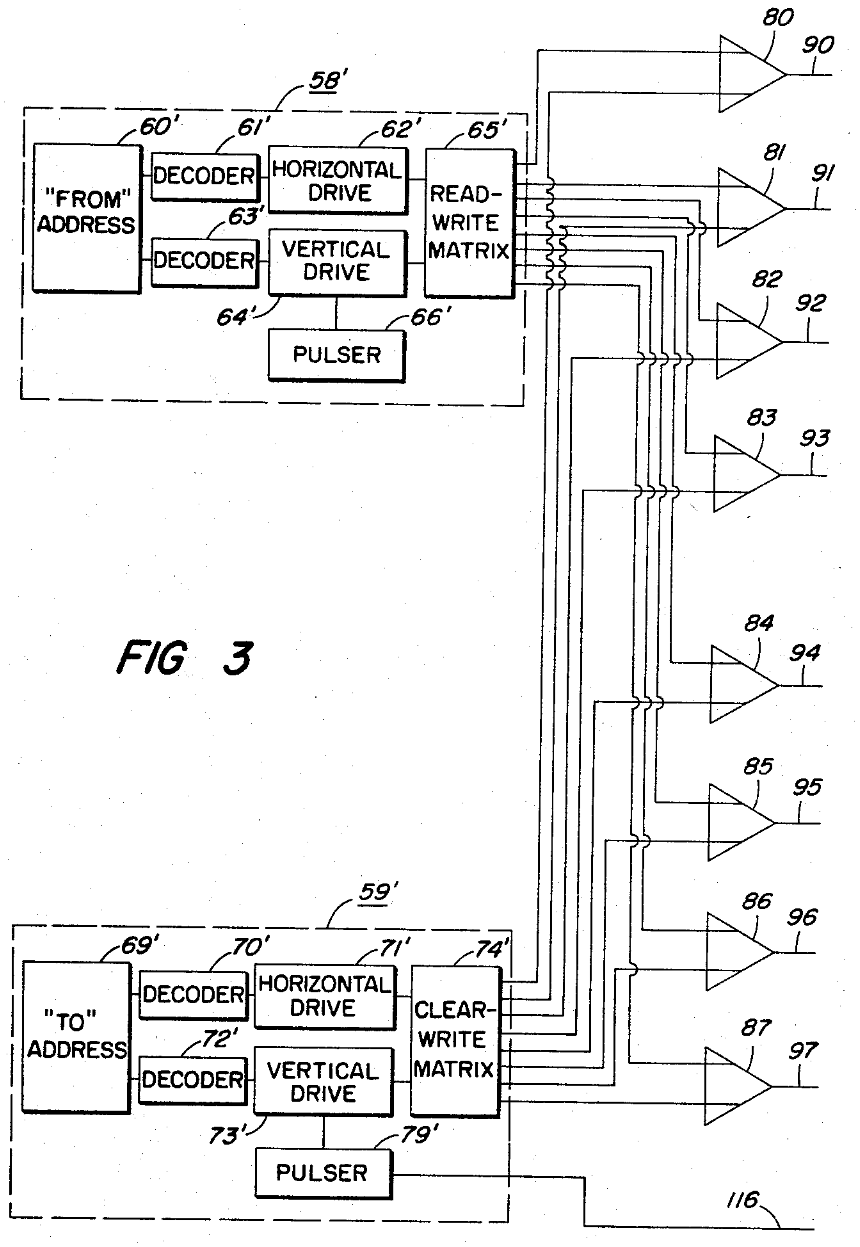
Figure 4:
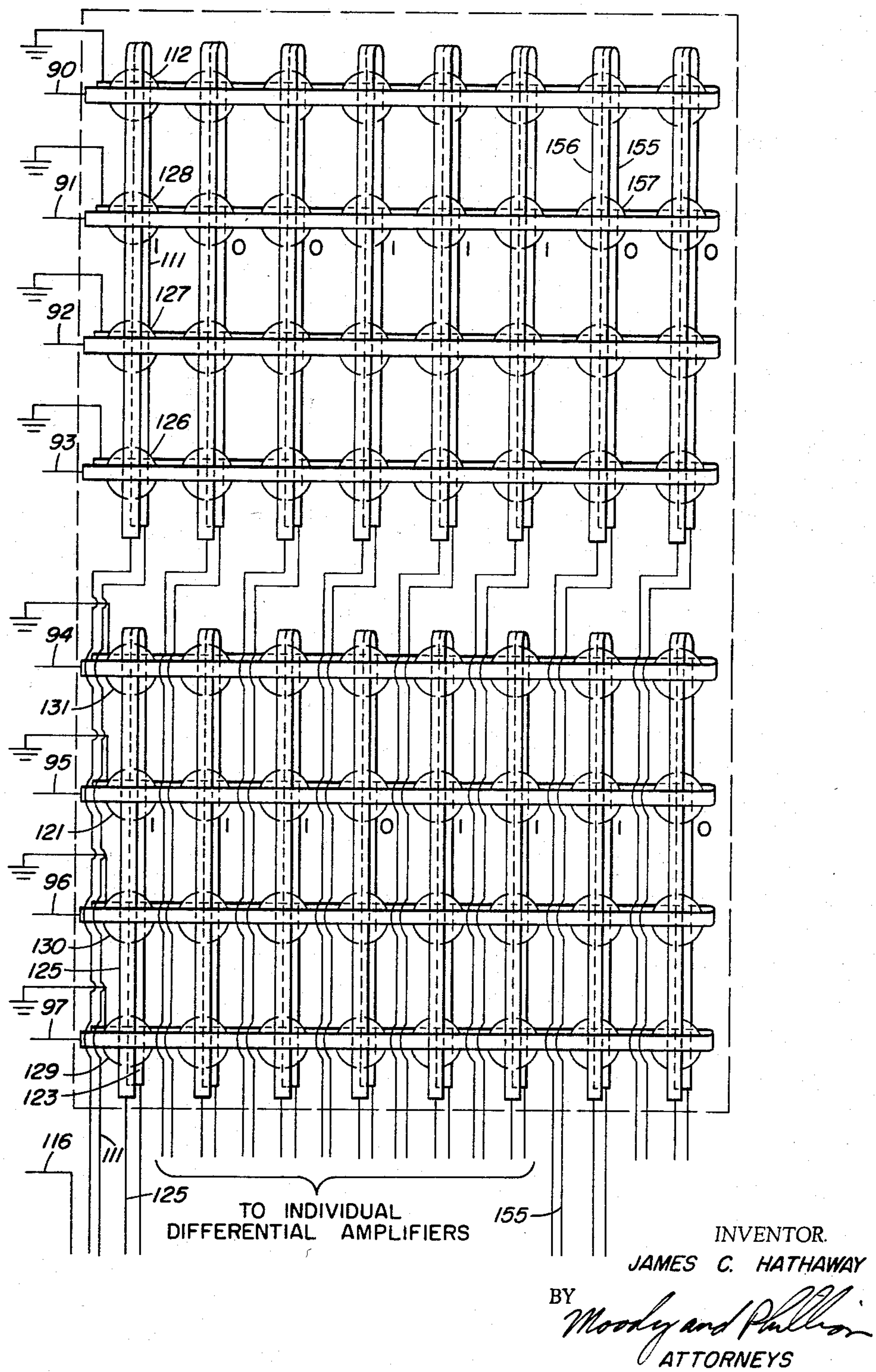
Figure 5:
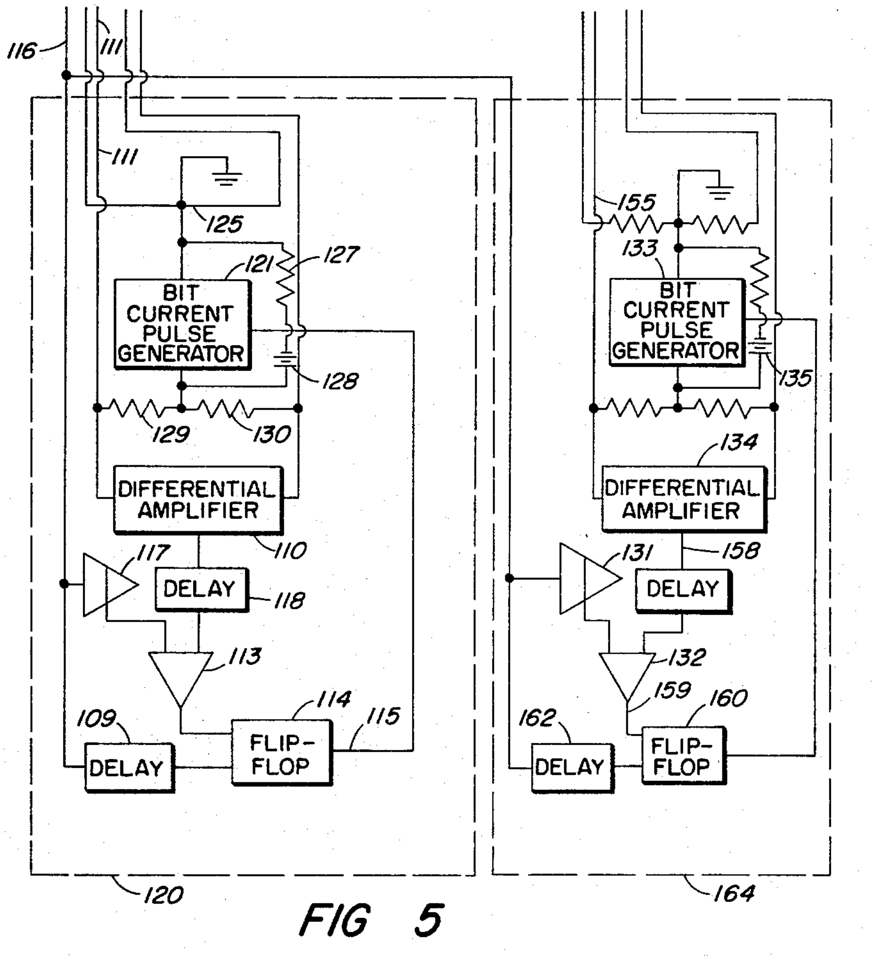
Figure 8:
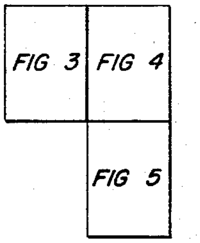
Figure 9:
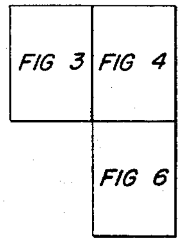
Figure 6:
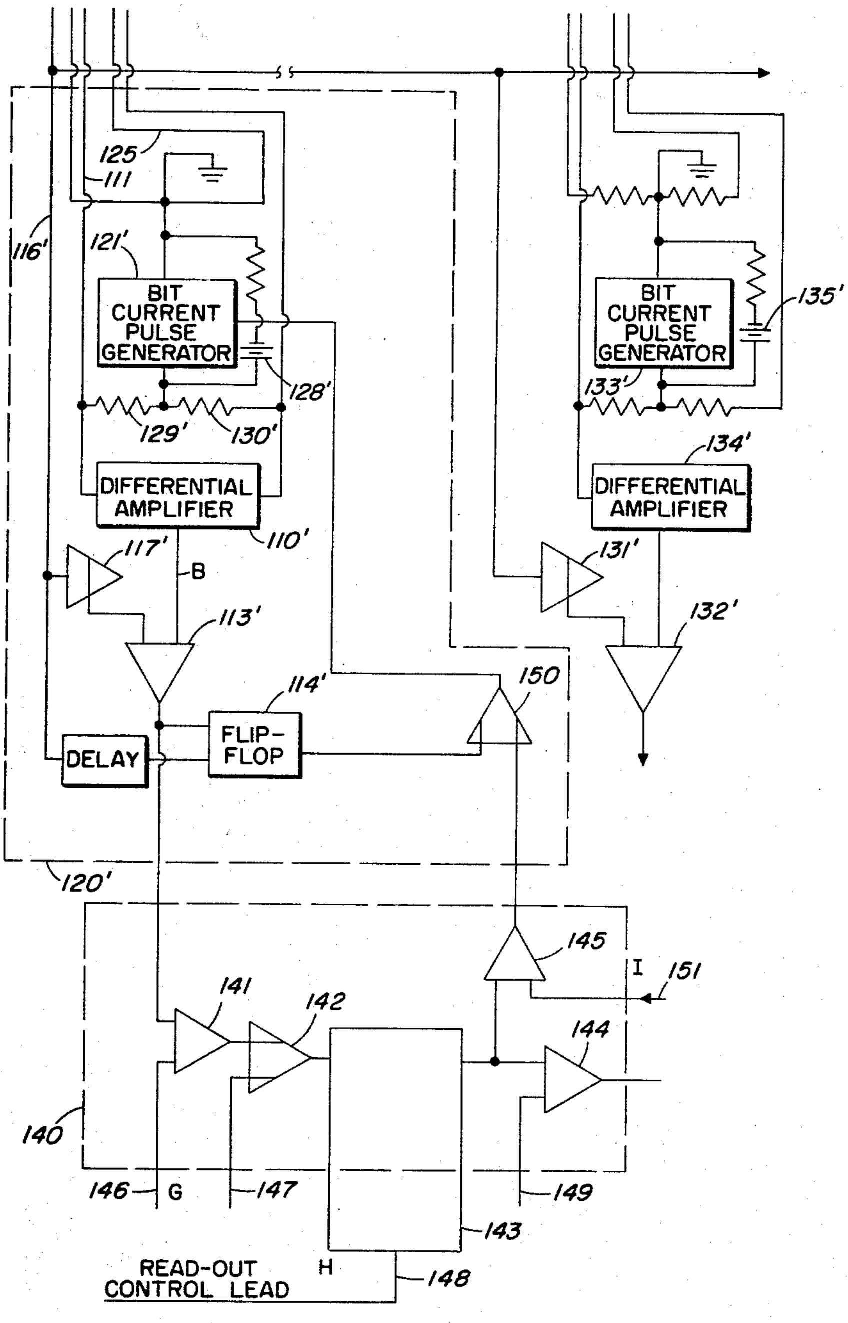
Figure 7:
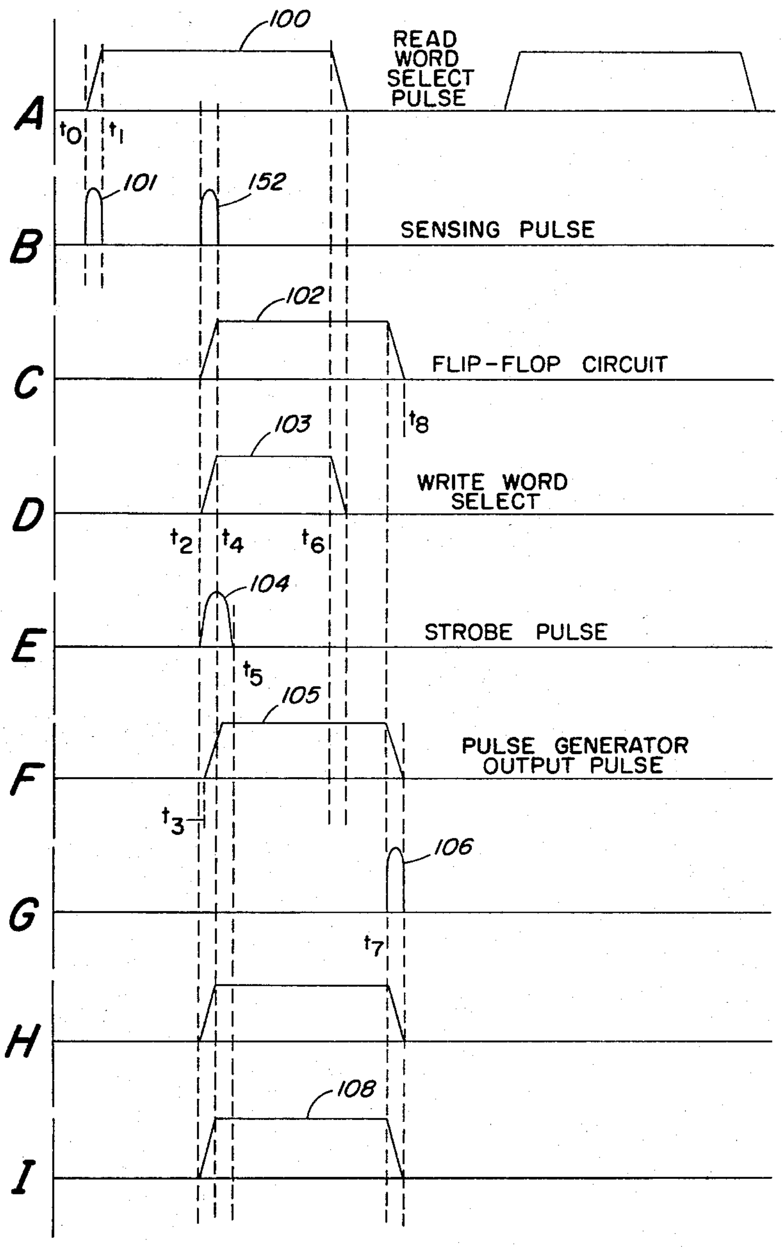

The above-mentioned and other objects and features of the invention will be more fully understood from the following detailed description thereof when read in conjunction with the drawings, in which:

FIG. 1 is a sketch showing the basic principle of reading a word from, and writing a word into, a thin film magnetic register;

FIG. 1*a* is a simplified vector diagram illustrating generally, how a binary "0" or "1" is read out of or written into, a magnetic spot;

FIG. 2 is a block diagram showing a general form of the invention;

FIGS. 3, 4, and 5 positioned together, as shown in FIG. 8, represent a more detailed schematic and block diagram of one form of the invention;

FIGS. 3, 4, and 6, positioned together as shown in FIG. 9, represent another embodiment of the invention; and FIG. 7 is a set of waveforms illustrating the timing relationship between the various control pulses and sensing pulses generated during a cycle of operation of the invention.

Referring now to FIG. 1, the thin film magnetic register comprises an insulative board 20 upon which are deposited a plurality of circularly shaped magnetic spots, such as spots 21, 22, 23, 24, 25, 26, and 27. These magnetic spots are arranged in rows and columns to form a matrix. In this specification a row will be designated as being horizontally positioned in the drawings and a column will be designated as being vertically positioned in the drawings. Further, a row will be denoted as containing a word and each column will contain a single bit of each word. Each of the circular spots contains a single binary bit representing pulses generated during a cycle of operation of the bit stored in each spot being represented by the polarization of the magnetic remanence of each spot. Such polarization of magnetic remanence is shown in a rather simplified vector diagram form in the single spot 28 of FIG. 1*a*. Arbitrarily, it has been shown in FIG. 1*a* that when the magnetic vector is directed to the right in the drawing as represented by vector 29, the spot contains a binary "1." If the spot is polarized in the opposite direction, as represented by the vector 30, the spot contains a binary bit "0." The third vector 31 is the transverse magnetic polarization produced by a "from" to "to" address pulse on one of the row selecting lines 32, 33, 34 or 35.

In the particular form of the invention described herein, battery source means 43 and bit lines such as lines 36 and 37 are provided to produce a first biasing magnetic field of sufficient strength to cause the magnetic polarization represented by vector 30, once transverse magnetization represented by the vector 31 (FIG. 1*a*) has been created in a spot. However, said biasing magnetic field is not sufficiently great to reverse by 180° the magnetic polarization of a spot if said spot is polarized to represent a binary bit "1," as represented by vector 29 in FIG. 1*a*. Worded in another way, when a transverse magnetic field is applied to polarize a spot 28 in a direction indicated by the vector 31, the energy required to rotate the vector 31 another 90° so that it assumes the position of vector 30 is sufficiently small so that the biasing magnetic field can accomplish such rotation. However, the said first magnetic biasing field does not contain sufficient energy to reorient the direction of magnetic polarization of the spot by 180°. Thus, a spot containing a "1" will, in the absence of a transverse magnetization, continue to contain a "1" in spite of the tendency of the magnetic biasing field to reverse the magnetic remanence.

If, however, it is desired to write a "1" into a spot after the magnetic polarization of the spot has been shifted to the position of vector 31, it is necessary to create a second biasing magnetic field which overrides the "0" producing magnetic biasing field created by battery source 43, and is of a polarity opposite thereto.

As indicated above, each spot of FIG. 1, such as spot 21, has two lines passing thereacross. In the case of spot 21, these two lines are horizontally positioned conductor 32 and vertical conductor 36. Each of the conductors 32 and 36, and the spot 21 are physically positioned very close together and are separated only by thin sheets of insulative material. The presence of a current through the strip-like conductor 32 or 36 will function to orient the magnetic field in the spot 21 in accordance with the vector 31, 29, or 30. Means, such a bit driver 41 or battery source 43, are provided to pass a current through the line 36 in either direction, thus making it possible to magnetize the spot 21 to represent a binary "1" or "0," as shown by the vector 29 or 30 in FIG. 1*a*.

Bit lines 36 and 37 have a voltage induced therein when a transverse magnetic field is created in an adjacent spot due to a signal supplied to the associated word select line. When such transverse field is created in a spot it produces a rotation of the existing magnetic field which can either be in a clockwise or in a counter-clockwise direction, depending upon whether the spot contained a "0" or a "1" just prior to the creation of the transverse magnetic field. Such difference in direction of rotation of the spot magnetic field will induce voltages of opposite polarity in the adjacent bit line.

Associated with the spots in column X of FIG. 1 is a bit driver 41, resistor 42, negative battery source 43, resistors 44 and 45, and terminals 46 and 47 which lead to a differential amplifier (not shown and sometimes referred to herein as a sensing amplifier). The terminal leads 46 and 47 are connected respectively to the bit lines 36 and 37. The bit driver 41 has its output terminal connected in parallel to the bit lines 36 and 37 of column X. Pulses from bit driver 41 are positive in nature and will flow through both the bit lines 36 and 37 in parallel to cause a "1" to be written into those particular spots of spots 21, 23, 24, and 27, in which a transverse magnetic field exists during the bit driver pulse. As to the remaining spots in column X, the positive pulse from the bit driver 41 will contain insufficient energy to reverse the magnetic feld therein. Thus, "0's" will remain in said remaining spots at the termination of the bit driver pulse.

In a case where there was no bit driver pulse present, the negative battery source 43 would provide a current through bit lines 36 and 37 to create a magnetic remanence representative of the bit "0" in those spots of spots 21, 23, 24, and 27 in which a transverse magnetic field has been created by a current through one of the word-selecting lines 32 through 35.

To clarify the foregoing, the following specific example is given. Assume that the spot 21 contains a "1" so that the polarity of magnetization is as indicated by vector 29 of FIG. 1*a*. Assume, also, that a pulse is supplied through the word-selecting line 32. All the spots in the first row, including spots 21, 22, and 26, will thereby have created therein a transverse magnetic field. However, for purposes of simplicity, only the phenomena occurring in the spot 21 will be discussed. When the pulse is passed through word-selecting lead line 32, the spot 21 will be magnetized in its transverse direction as indicated by vector 31 of FIG. 1*a*, thus causing a rotation of the magnetic field vector of 90° in a counterclockwise direction. Such rotation of the magnetic field vector in spot 21 will result in a voltage of a first polarity being induced in the bit line 36 and thence on the output terminal 46. Since no voltage has been induced in the bit line 37, there will be a voltage differential across the terminals 46 and 47 of a polarity determined by the direction of rotation of the magnetic field in spot 21. Such voltage differential is supplied to a differential amplifier (not shown in FIG. 1) which, in turn, through circuitry not shown in FIG. 1, will cause the bit driver 41 to become conditioned to generate a driving pulse. The pulse generated by said bit driver 41 will flow in parallel through bit lines 36 and 37 and will cause only the spot 21 to be magnetized as represented by the vector 29 of FIG. 1*a*. The polarity of magnetization of the spots 23, 24, and 27 will not be altered by the pulse from bit driver 41 since these spots have not had created therein a transverse magnetic field and there is insufficient energy in the bit driver pulse to switch the polarity of magnetization by 180°.

Assume now the case where spot 21 has a binary "0" stored therein and it is desired to read out said "0" and then to write a "0" back into spot 21. Under such circumstances, a pulse is supplied through the word-selecting line 32 to cause a 90° rotation of the magnetic vector in a clockwise direction, thus inducing a voltage in the bit line 36 of a polarity indicating the readout of a "0." However, to write a "0" back into the spot 21, it is necessary that the bit driver 41 not produce an output pulse at the termination of the word-select pulse. The write-in of a "0" into the spot 21 is accomplished by the biasing magnetic field created by the battery source 43 which causes a constant D.-C. current flow through the bit lines 36 and 37. As discussed hereinbefore, such biasing magnetic field will rotate a magnetic field vector of spot 21, 90° from a condition of transverse magnetization back to the "0" position of vector 30 of FIG. 1*a*. However, such biasing magnetic field will cause such orientation only when a transverse magnetic field has been created in a spot, such as spot 21. In the remaining spots 23, 24, and 27 of column X, the biasing magnetic field created by the current flow from the battery source 43 will produce no effect on the orientation of the magnetic field vectors therein due to insufficient energy level.

Each of the columns X, Y, and Z have a bit driver and a differential amplifier individual thereto. For purposes of simplicity, the detailed circuits of the bit drivers and differential amplifiers of columns Y and Z have not been shown in FIG. 1, although they are shown in more detail in FIGS. 3, 4, and 5, and in FIGS. 3, 4, and 6, which will be discussed later herein.

Before discussing the arrangements of FIGS. 3, 4, and 5, and FIGS. 3, 4, and 6, a block diagram of the over-all system as shown in FIG. 2, will be discussed. In FIG. 2, the thin film magnetic register is represented by block 68 and consists of eight rows of spots and eight columns of spots to form a matrix of 64 spots. The rows represent words, and the columns each represent a bit of each word as in the case of FIG. 1. The differential amplifiers are represented collectively by the block 76, which includes eight such differential amplifiers, one for each column. Similarly, the bit drivers are represented collectively by the block 77 which includes eight such bit drivers, one for each column.

An input-output register is represented by block 78 and functions, generally, as a means of transferring words between the thin film magnetic register 68 and external peripheral devices (not shown).

As discussed above, a basic purpose of the invention is to provide a structure which will read a word from a given address in the thin film magnetic register 68 and then write said word back into the given address, and also into another address of the thin film register, all in a single cycle of operation. To accomplish the foregoing, there are provided two main circuits denoted generally by the dotted blocks 58 and 59 in FIG. 2. The block 58 contains circuit means for selecting the address in the register 68 from which the word is to be read, and the block 59 contains circuit means for selecting a second address in register 68 into which the selected word is to be written. Also, the selected word will be rewritten back into the said first address.

The "from" address circuit 60 functions to produce two codes, one of which is supplied to decoding circuit 61 and the other of which is supplied to decoding circuit 63. The decoding circuit 61 is constructed to respond to the code supplied thereto to select a given horizontal row of the read-write matrix 65. Horizontal drive circuit 62 functions to amplify the output of block 61, and also to gate the output of decoder 61 to the matrix 65 at the proper time, in response to a gating pulse from pulser 66. Decoder 63 is constructed to select a given vertical column of the read-write matrix 65. The vertical drive circuit 64 functions to amplify and, in response to a gating pulse from pulser 66, to gate the output signal of decoder 63 at the proper time to the read-write matrix 65.

By selecting a given row and a given column of the read-write matrix 65, a particular matrix point is selected; said particular matrix point being connected to a particular address row of the magnetic register 68 through the group of leads designated, generally, by reference character 67. There is a matrix point in the read-write matrix 65 for each address row of the thin film magnetic register 68.

In the decoder 61, the number of output leads therefrom (and also from the horizontal driver circuit 62) equals the number of rows in the read-write matrix 65 and, in fact, are individually connected to each of said rows in order to select a given one of said rows. Similarly, the output leads from the decoder 63 and from the vertical driver 64 equal the number of columns of the matrix 65, and are individually connected thereto. Thus, any point in the matrix 65 can be selected, which point is connected to a given address of the thin film register 68. Since the matrix of FIG. 2 contains eight matrix points, it can have either four columns and two rows, or two columns and four rows of points.

The circuit within dotted block 59 is quite similar to that within the dotted block 58. Decoders 70 and 72 function to decode a binary code supplied thereto to provide output signals which select a given horizontal row and a given vertical column of clear-write matrix 74 through horizontal and vertical drives 71 and 73, respectively. The clear-write matrix 74 has a plurality of output leads designated, generally, by the line 57, each of said output leads going to one of the addresses of the register 68. The principal difference between the circuits of block 58 and block 59 is in the timing of the address selection. As stated above, the read-write matrix 65 selects an address prior to the selection of an address by the clear-write matrix 74. During the interval of time between the selection of the two addresses, the read-out of the word in the first address is accomplished. Differential amplifier means 76, which accomplishes such read-out, is disabled before matrix 74 selects an address, with the result that no read-out of the word in the address selected by matrix 74 occurs.

The eight separate differential amplifiers in the block 76, one for each column of bits, respond only to the read-out of a "1" in any of the bits constituting a given word. The eight bit drivers, represented collectively by block 77, are individually responsive to the output signals of the eight differential amplifiers of block 76 to be conditioned to write a binary "1" in given bit positions of the selected row of the register 68. Thus, the eight bit drivers will be conditioned in the same coded manner as the word read-out of the thin film register. Later a timing pulse is supplied from the timer 79 into the bit drivers 77 to energize only those bit drivers which have been conditioned as defined above. Upon receipt of such timing pulse, the bit drivers 77 will rewrite into the address selected by the matrix 65 and also the address selected by the matrix 74, the same word that was read out of the address selected by the matrix 65. Each of the lines 55, 56 and 104 represent eight separate leads.

An input-output means is required to read into the register 68 information from peripheral devices (not shown) and also to read information from the register 68 into peripheral devices. Such bilateral transfer of information is accomplished by the input-output (I/O) register 78 which comprises eight separate flip-flop circuits, one each associated with a given column of bits in the register 68. Each of the leads 103, 105, 107, and 108 constitute eight individual leads going to individual flip-flop circuits of the input-output register.

Referring now to FIGS. 3, 4 and 5 arranged in the manner of FIG. 8, there is shown a more detailed block diagram of the circuit of FIG. 2, but with the omission of the input-output register 78 of FIG. 2. The circuit of FIGS. 3, 4, and 5 will be discussed with the aid of the waveforms A, B, C, D, E, and F of FIG. 7, which waveforms show the timing relationship during a cycle of operation.

The thin film magnetic register shown in FIG. 4, consists of eight horizontal rows of magnetic spots, each row consisting of eight magnetic spots and constituting a word. The means for selecting the addresses of the eight words is shown in FIG. 3, and the means for sensing the word in a selected address and for writing the selected word back into the selected addresses is shown in FIG. 5. Circuit components of FIGS. 3, 4, and 5, and also FIG. 6 which corresponds to components of FIG. 2, are identified by the same reference character, although primed.

In FIG. 3 the circuit means within block 58' functions to select one of the eight output leads of the read-write matrix 65'. The output leads of matrix 65' are each connected to an input lead of one of the eight "or" circuits 80 through 87, inclusively, whose output leads 90 through 97 constitute the addresses for the eight word lines of the thin film registers of FIG. 4. Similarly, the eight output leads of the clear-write matrix 74' are individually connected to the eight "or" circuits 80 through 87. Thus, both the outputs of the matrix 65' and the matrix 74' can select independently any one of the eight word lines 90 through 97 of the register of FIG. 4.

In discussing the operation of the circuit, let it be assumed arbitrarily that the matrix 65' has selected the word line 91 by passing the pulse 100 of curve A of FIG. 7 therethrough at time $t_0$. Further, let it be assumed that the word line (or word row) 91 contains the binary word "10011100," as indicated in FIG. 4. During the time interval $t_0$–$t_1$ a pulse 101, shown in waveform B of FIG. 7, is induced in the bit line 111 due to rotation of the magnetic field vector in spot 128. The pulse 101 is supplied through bit line 111 to the differential amplifier 110 of FIG. 5, which is isolated from bit current pulse generator 121 by resistors 129 and 130. The output pulse of the differential amplifier, which is a pulse similar in shape to the pulse 101 of waveform B, is delayed by delay means 118 and, during time interval $t_2$–$t_4$, is supplied through "and" gate 113 (when opened) to a flip-flop circuit 114 to cause the potential of the flip-flop output terminal 115 to assume its high level value at time $t_4$, as shown in curve 102 of FIG. 7, which represents the output signal of flip-flop 114. The delayed output pulse from differential amplifier 110 is represented by pulse 152 of FIG. 7B. A strobe pulse is supplied by timer 79' of FIG. 3 to line 116. When inverted by inverter 117 of FIG. 5, the strobe pulse will be supplied as a high-level signal to "and" gate 113, thus causing said "and" gate 113 to open when the delayed output pulse 152 (curve B) from differential amplifier 110 is supplied thereto.

It should be noted that several circuit elements shown in FIGS. 3, 5, and 6, operate on a two-level basis. For example, as indicated above, the output signal of the flip-flop circuit 114 of FIG. 5 has two levels, a high level and a low level. The "and" gates 113 and 132, as well as the inverter circuits 117 and 131 of FIG. 5, operate on a two-level input and output signal basis. More specifically, each of the "and" gates 113 and 132 function to provide a high-level signal on their output terminal only in the presence of high-level signals on both of their input terminals. If a low-level signal is present on either of the input terminals of any of the "and" gates, a low-level signal will appear on the output terminal. In FIG. 3 there is shown a number of "or" gates 80 through 87. Each of these "or" gates will function to produce a high-level signal on its output terminal if a high-level signal is supplied to any one of its input terminals. A low-level signal will appear on the output terminal of an "or" gate only if low-level signals are applied to all of the input terminals thereof. Although FIG. 6 has not yet been discussed, the definitions of "and" gates, "or" gates and inverters just given in connection with FIGS. 3 and 5, apply to the "and" gates, "or" gates, and inverter circuits, shown in FIG. 6.

Returning again to the specific operation of FIG. 5, the output of flip-flop circuit 114, represented by the curve 104 of FIG. 7, functions to concurrently cause the bit current pulse generator 121 to generate the bit driver pulse 105 shown in the curve of FIG. 7F. The delay circuit 109 functions to delay the strobe pulse from timer 79 a short interval of time to produce a delayed pulse 106 of FIG. 7G, which is supplied to the flip-flop circuit 114 at time $t_7$ to cause the output terminal 115 of said flip-flop circuit to assume its low level at time $t_8$ in the curve of FIG. 7C.

It will be noted that when said flip-flop assumes its high level at time $t_2$, the word lines of FIG. 4 which have been selected by read-write matrix 65' and clear-write matrix 74' of FIG. 3 will be magnetically polarized in a transverse manner. Consequently, the spots in the two selected addresses are in a condition to have bits written therein. Thus, the bit driver pulse 105 of curve F of FIG. 7 will write a "1" into the corresponding spot of each of the selected addresses of FIG. 4. In the foregoing discussion it will be assumed, arbitrarily, that the pulse 103 from the clear-write matrix 74' of FIG. 3 selected the address line 95 in the register of FIG. 4. Further, assume that said word line originally contained the binary word "11101110."

The aforementioned discussion covers the case where a "1" was stored in the spot 128. In the case where a magnetic spot in a selected word row contains a "0," a negative pulse will be generated in the corresponding sensing lead. For example, in the seventh column of magnetic spots, which includes the magnetic spot 157 of FIG. 4, a negative pulse will be generated in the bit lead 155 due to the transverse magnetization of spot 157 when the word line 91 is energized. Such a negative pulse will produce a negative pulse output signal on the output terminal 158 of the differential amplifier 134 of FIG. 5. Thus, the "and" gate 132 cannot open and its output terminal 159 will have a low-level signal thereon with the result that the flip-flop circuit 160 will have a low-level signal on its output terminal. Consequently, the bit current pulse generator 133 will not be activated to produce a driver pulse. Since no driver pulse is generated by the pulse generator 133, the spot 157 of FIG. 4 will be magnetically biased to represent a binary bit "0" by biasing battery source 135. A binary bit "0" will be written into the seventh column spots of both addresses selected by the matrices 65' and 74' of FIG. 3.

From the foregoing discussion, it is apparent that both binary bits "1" and "0" will be faithfully rewritten back into the addresses selected by the matrices 65' and 74' of FIG. 3 to coincide with the word read from the address selected by the matrix 65'.

Returning now to the case where a "1" is being rewritten back into the register of FIG. 4, additional discussion will follow concerning the effect of a bit driver pulse on the register of FIG. 4. The driver pulse is supplied to bit lines 111 and 125 which are connected in parallel and each of which functions to drive four of the eight spots in each column. More specifically, the line 111 passes across the upper four magnetic spots 126, 127, 128, and 112, and the bit line 125 passes across the spots 129, 130, 121, and 131 which comprise the four lower spots in the first column of FIG. 4. As discussed above, the current through bit lines 111 and 125 is of a magnitude such that it will not affect the magnetization of those spots which contain either a "0" or a "1," but will effect only the magnetization of those spots which have been magnetized transversely by the word-selecting lines, such as word-selecting lines 91 and 95 of FIG. 4. Thus, the magnetic field of the spots 128 and 121 in the first column of spots will be altered by the bit driver pulse to contain a binary "1" therein. It will be noted that the bit driver pulse 105 of FIG. 7F continues after the termination of the address selecting pulses 100 and 103 of the curves of FIGS. 7A and 7D. Thus, final magnetization of the spots 112 and 121 occurs at about time $t_6$ when word-selecting pulses 100 and 103 terminate. At time $t_8$ the bit driver pulse 105 terminates to complete the cycle. The circuit is now ready to receive another address selecting pulse from the read-write matrix 65' of FIG. 3.

A discussion of the form of the invention shown in FIGS. 3, 4, and 6 arranged as in FIG. 9 will now be discussed. The circuit of FIGS. 3, 4, and 6 is similar to that of the arrangement of the circuit of FIGS. 3, 4, and 5 with the exception that FIG. 6 includes a showing of the input-output register 78 of FIG. 2. The input-output register and associated circuit means is contained within the dotted block 140 of FIG. 6 and consists specifically of "and" gate 141, "or" gate 142, a block of eight flip-flops shown collectively as block 143, "and" gate 144, "and" gate 145, and information input and control leads 146, 147, 148, and 149. The eight flip-flops of block 143 are individual one each to the eight bit columns of the thin film magnetic register of FIG. 4.

The remainder of the circuit of FIG. 6 is substantially the same as that of FIG. 5 and corresponding circuit elements are identified by the same reference character as in FIG. 5, although primed. One circuit element common to blocks 120' and 140 of FIG. 6 is the "or" gate 150 which provides a means for supplying a control pulse to the bit current pulse generator 121' from either the thin film magnetic register of FIG. 4 or from the register 143 of FIG. 6. The problems associated with adding the input-output register 143 are primarily problems of timing. Information can be supplied from a peripheral device (not shown) directly to the register 143 through control leads such as control lead 147 and "or" circuit 142. The timing of writing such information into the register 143 from a peripheral device is not particularly critical with respect to the transfer of information from one address to another in the thin film register. However, precautions should be taken to prevent the simultaneous write-in of information into register 143 both from a peripheral device and from the thin film magnetic register.

Information from the thin film register of FIG. 4 is written into register 143 through "and" gate 141 by supplying a high-level pulse to control lead 146 which opens "and" gate 141 and allows passage of information from the thin film magnetic register into register 143 through "or" gate 142.

Timing of the pulse supplied to the control lead 146 of "and" gate 141 is critical in that it must be substantially coincident with the output pulse from "and" gate 113', which represents the information read from a magnetic spot of the thin film register. In the above-discussed example, in which word-line 91 of the thin film register was selected, the pulse from the "and" gate 113' represents a "1" read from the magnetic spot 128. Thus, by opening "and" gate 141, the word read from the word-line 91 would be transferred to the register 143, as well as being read back into the word 91, in the manner described in connection with the circuit of FIGS. 3, 4, and 5.

If it is desired to read a word from the register 143 of FIG. 6 and to write such word into the thin film magnetic register, the following timing operation can be employed. The address of the thin film register is selected by an output pulse (pulse 103 of FIG. 7D) from the clear-write matrix 74' of FIG. 3. The pulse 103 is employed rather than the pulse from the read-write matrix 65 since the pulse from matrix 74' will clear the word from the thin film register, but will not condition any of the flip-flop circuits, such as flip-flop 114' to later cause erroneous energization of any of the bit current pulse generators. In other words, by using the output signal from the clear-write matrix 74' the word is cleared from the selected address and is not written back therein. Thus, the address is clear for write-in of the word from the register 143 of FIG. 6. Pulses 107 and 108 of FIGS. 7H and 7I are supplied simultaneously to the control leads 148 and 151, respectively, of FIG. 6, and are timed to occur at the beginning of the pulse from the clear-write matrix 74', thus causing the bit current pulse 105 of FIG. 7 to commence at the proper time with respect to the pulse 103 of FIG. 7D. If pulses 107 and 108 occur too early, as for example at time $t_1$, the bit current pulse generator would generate a driver pulse which would terminate before the termination of pulse 103 (FIG. 7) from the clear-write matrix of 74', thus preventing proper orientation of the magnetic field vector of the selected magnetic spot. In fact, if such incorrect timing did occur, the selected magnetic spot in the register of FIG. 4 would be polarized by the battery 128' of FIG. 6 and would register a binary "0" rather than a binary "1."

Should it be desired to read information contained in the register 143 into some peripheral device (not shown) the control leads 148 and 149 are energized simultaneously. However, with such an information transfer, the timing is not critical and can occur independently of the operation of the thin film magnetic register, with the following exception. In many types of registers, read-out and write-in cannot occur simultaneously. Consequently, if such type register were employed in block 143, simultaneous read-out and write-in could not occur.

In this specification only one means has been shown for the read-out and the write-in of information from and to the spots. More specifically, the arrangement shown herein is a balanced system wherein the differential amplifier, such as amplifier 110' of FIG. 6, is connected to two sensing leads arranged in parallel to each cover one-half the spots in a column of spots. By this balanced arrangement the relatively large voltages created across the two input leads of the differential amplifier 110' because of the large driving currents are equal, so that they cancel with the result that substantially no net voltage is supplied across the differential amplifier due to the writing function. In some other arrangements for writing, relatively large voltages will occur across the sensing (differential) amplifiers, and even though the sensing amplifiers are in a non-energized condition at the time, the applied voltages may be of such a magnitude as to shock the amplifiers and de-sensitize them for a short interval of time following the write-in function, thus slowing down the operation of the memory and also introducing the possibility of erroneous sensing.

With the arrangement shown in FIGS. 5 and 6, a voltage induced in a sensing lead, such as sensing lead 111 during a read-out function, appear as a differential voltage across the differential amplifier 110' to permit the differential amplifier to perform its normal sensing function. It will be observed that owing to the arrangement of FIG. 4 wherein one of the sensing leads covers a first half of a column of bits and the other sensing lead covers the other half of magnetic spots, that the selection of an address must necessarily create a voltage on either one or the other of the two sensing leads. A bit signal voltage cannot be generated in both sensing leads at the same time. However, extraneous noise signals will very likely appear simultaneously in both of the sensing leads, thus canceling each other so that no appreciable net voltage from noise ordinarily will appear across the differential amplifiers to which they are connected.

Reference is made to the IRE article mentioned hereinbefore, for accomplishing the specific function of writing a bit into a spot and reading a bit from a spot by means differing from the means described herein. Such other means are incorporated herein as a part of this specification.

It is to be understood that the forms of the invention shown and described herein are but preferred embodiments thereof and that various changes may be made in the circuit arrangements without departing from the spirit or the scope of the invention.

I claim:

1. Memory access means for reading information from a first address of a memory matrix comprised of vertical columns and horizontal rows of magnetic elements and for writing back into said first address and a selected second address, comprising:

a plurality of address selecting conductors, one individual to each row of magnetic elements and constructed, in response to a current therethrough, to cause an alteration of the magnetization of the magnetic elements in a selected row of magnetic elements, a plurality of bit conductors, one individual to each column of magnetic elements and constructed to respond to the alterations in the magnetization of individual magnetic elements of the selected row to have produced therein sensing current pulses representative of the information stored in said selected row of elements, said plurality of bit conductors further constructed, in response to a current therethrough, to magnetize the addressed magnetic elements of a selected column of magnetic elements in a polarity determined by the polarity of the current therethrough, first row selecting means for passing a current through a first one of said address selecting conductors to cause read-out of the information stored therein, second row selecting means including means for passing a pulse through a second one of said address selecting conductors a predetermined time interval after energization of said first address selecting conductor, a plurality of detecting means, one individual to each column of magnetic cores and comprising sensing means and storage means constructed to repsond only to that sensed current of the associated bit conductor derived from energization of an address selecting conductor by said first row selecting means and to store the information represented by the sensed current, said detecting means further constructed to produce an output signal from said storage means after energization of the address selecting conductor of said second row selecting means, and a plurality of bit current pulse generators, one individual to each column of magnetic elements and responsive to the output of said storage means to produce a driving signal through the bit conductor of the associated column of magnetic elements to magnetize said magnetic elements of the first and second selected rows in accordance with the original state of magnetization of said first row of magnetic elements.

2. Memory access means in accordance with claim 1 in which said memory matrix comprises a sheet of insulated material with said plurality of magnetic elements formed thereon in rows and columns to form a matrix, in which each of said magnetic elements comprises a magnetic spot, and in which each of said magnetic spots has passing thereacross and adjacent thereto a bit conductor and an address selecting conductor insulated from each other and from said magnetic spot but positioned sufficiently close to said magnetic spot to be magnetically coupled with said spot to enable reading and writing of information from and into said magnetic spot.

3. Memory access means in accordance with claim 1 in which a current of a first polarity supplied to a given one of said bit conductors will tend to produce a first polarity of magnetic remanence in the magnetic spots of the associated column of magnetic spots, in which a current of opposite polarity through said bit conductor will tend to produce a second polarity of magnetic remanence 180° removed from the polarity of said first magnetic remanence, and in which said first row selecting means and said second row selecting means are constructed to produce pulses which, when supplied through the selected address selecting conductors, will rotate the magnetic remanence vector of all the magnetic spots of said selected row to the same direction, which direction will be plus or minus 90° removed from the vectors representing either the first or second polarities of magnetic remanence, and in which said magnetic spots of the selected rows of spots will, upon termination of the pulses from the row selecting means, return to a magnetic remanence in accordance with the polarity of the current subsisting in the bit conductor at the time of said termination.

4. Memory access means in accordance with claim 1 in which each of said detecting means comprises a gating circuit constructed to cause storage in said storage means as a result of a pulse being generated in the associated bit conductor as a consequence of energization of an address selecting conductor by said first row selecting means, and to block storage of said storage means during the presence of an output signal from said second row selecting means.

5. A memory access system in accordance with claim 1 comprising an input-output register having an individual bistable device for each column of magnetic elements, first gating circuit means for supplying information bidirectionally between said memory matrix and said input-output register, and second gating circuit means for supplying information bidirectionally between said input-output register and peripheral devices.

6. A memory access means in accordance with claim 5 comprising timing means for selecting an address of said memory matrix by means of said second row selecting means only, in which said first gating circuit means comprises a plurality of first "and" gates individually connected between each of the bistable devices of said input-output register and the associated bit current pulse generator, and means responsive to said timing means to simultaneously open said "and' gates and read the information from the bistable devices of said input-output register into the associated bit current pulse generators at a predetermined time with respect to the output signal generated by said second row selecting means, to cause said bit current pulse generators to write into the address selected by said second row selecting means the data read from said input-output register.

7. A memory access means in accordance with claim 5 in which said first gating circuit means comprises a plurality of second "and" gates constructed when opened to connect the sensed output signals detected by said detecting means to said input-output register, said second "and" gating means further constructed to respond to said timing means to become opened during the time interval said sensed output signals produced by said first row selecting means are supplied to said plurality of second "and" gates, and means for supplying said sensed output signals to said plurality of second "and" gates.

8. In a memory access system including a memory device comprising a plurality of magnetic spots arranged in matrix manner to form a plurality of vertical columns and horizontal rows of said magnetic spots wherein each of said rows of magnetic spots constitutes an address, means for reading from a first address of said memory matrix and for writing back into said first address and also a second selected address comprising:

a plurality of address selecting conductors, one individual to each row of magnetic spots and constructed to respond to a current therethrough to cause an alteration of the magnetization of the magnetic spots in a selected row of magnetic spots, a plurality of bit conductors, one individual to each column of magnetic spots and constructed to respond to alteration in the magnetization of individual magnetic spots of the selected row of spots to have produced therein sensing current pulses representative of the information stored in said selected row of spots, said plurality of bit conductors each further constructed to respond to a current therethrough to magnetize a selected column of magnetic spots in a polarity determined by the polarity of the current therethrough, time base generating means, first row selecting means responsive to an output signal from said time base generating means for passing a pulse through a first of said address selecting conductors to cause read-out of the information stored therein, second row selecting means responsive to an output signal from said time base generator means to pass a pulse through a second of said address selecting conductors a predetermined time interval after energization of said first address selecting conductor, a plurality of detecting means, one individual to each column of magnetic spots and constructed to respond only to that sensed current of a given polarity which is derived from energization of an address selecting conductor by said first row selecting means, said detecting means further constructed to produce an output signal after energization of the address selecting conductor of said second row selecting means, a plurality of bit current pulse generators, one individual to each column of magnetic spots, and constructed to respond to the output of said detecting means to produce a driving signal through the bit conductor of the associated column of magnetic spots to magnetize said magnetic spots of the first and second selected rows in accordance with the original state of magnetization of said first row of magnetic spots.

9. Memory access means in accordance with claim 8 in which a current of a first polarity supplied to a given one of said bit conductors will tend to produce a first polarity of magnetic remanence in the magnetic spots of the associated column of magnetic spots, in which a current of the opposite polarity through said bit conductor will tend to produce a second polarity of magnetic remanence 180° removed from said first polarity, in which said first row selecting means and said second row selecting means are constructed to produce pulses, which when supplied through the selected address selecting conductors, will rotate the magnetic remanence vector of all the magnetic spots of said selected row to the same direction, which direction will be plus or minus 90° removed from the vector representing either the first or second polarities of magnetic remanence, and in which said magnetic spots of the selected rows of spots will, upon termination of the pulses from the row selecting means, return to a magnetic remanence polarity in accordance with the polarity of the current subsisting in the bit conductor at the time of said termination.

10. Memory access means in accordance with claim 8 in which each of said detecting means comprises a storage means and a gating means constructed to cause storage in said storage means when a pulse is generated in the associated bit conductor as a result of energization of an address selecting conductor by said first row selecting means, and to block storage in said storage means during the presence of an output signal from said second row selecting means, said detector means further constructed to produce from said storage means the output signal for energizing said bit current pulse generator.

11. A memory access system in accordance with claim 8 comprising an input-output register having an individual bistable device for each column of magnetic elements, first gating circuit means for supplying information bidirectionally between the memory matrix and said input-output register, and second gating circuit means for supplying information bidirectionally between said input-output register and peripheral devices.

12. A memory access means in accordance with claim 11 comprising means for selecting an address of said memory matrix by means of said second row selecting means only, in which said first gating circuit means comprises a plurality of first "and" gates individually connected between each of the bistable devices of said input-output register and the associated bit current pulse generator, and means responsive to said time base generating means to simultaneously open said "and" gates and read the information from the bistable devices of said input-output registers into the associated bit current pulse generators at a predetermined time with respect to the output signal generated by said second row selecting means, to cause said bit current pulse generators to write into the address selected by said second row selecting means the data read from said input-output register.

13. A memory access means in accordance with claim 11 in which said first gating circuit means comprises a plurality of second "and" gates constructed when opened to connect the sensed output signals detected by said detecting means to said input-output register, said second "and" gating means further constructed to respond to said time base generating means to become opened during the interval of time said sensed output signals produced by said first row selecting means are supplied to said plurality of second "and" gates, and means for supplying said sensed output signals to said plurality of second "and" gates.

No references cited.

BERNARD KONICK, *Primary Examiner.*

G. LIEBERSTEIN, *Assistant Examiner.*